United States Patent [19]
Friedman

[11] Patent Number: 6,118,814
[45] Date of Patent: Sep. 12, 2000

[54] COMMUNICATION SYSTEM

[75] Inventor: Vladimir Friedman, Scotch Plains, N.J.

[73] Assignee: Analog Devices, Inc., Norwood, Mass.

[21] Appl. No.: 08/861,234

[22] Filed: May 21, 1997

[51] Int. Cl.[7] .......................... H04B 10/18; H04L 27/01
[52] U.S. Cl. .......................................................... 375/232
[58] Field of Search .................................. 375/232, 233, 375/234, 235, 236, 229; 708/300, 322, 323

[56] References Cited

U.S. PATENT DOCUMENTS

| | | | |
|---|---|---|---|
| 5,353,307 | 10/1994 | Lester et al. | 375/233 |
| 5,640,418 | 6/1997 | Tanaka | 375/232 |
| 5,710,793 | 1/1998 | Greenberg | 375/232 |
| 5,914,990 | 6/1999 | Soderkvist | 375/350 |

*Primary Examiner*—Don N. Vo
*Attorney, Agent, or Firm*—Fish & Richardson P.C.

[57] ABSTRACT

A method and system for providing adaptive filtering in a communication system. The method and system modify coefficients of a finite impulse response filter fed by a sequence of digital samples in accordance with an error signal in floating point format. The floating point error signal includes only a sign bit and an exponent term. The exponent term is added to an exponent term of an adaptation coefficient to produce a composite error signal. The adaptive filter is used as a linear adaptive equalizer and as an echo canceler.

21 Claims, 12 Drawing Sheets

COMMUNICATION SYSTEM

BACKGROUND OF THE INVENTION

This invention relates generally to communication systems and more particularly to adaptive filters used in such communication systems.

As is known in the art, adaptive filters have been used in communication systems to provide such functions as channel phase and amplitude dispersion equalization and channel echo cancellation. For example, in transmitting information to a receiver, such transmitted information passes through a communication channel. The communication channel may be a pair of wires, (e.g., a so-called twisted pair such as used in telephones, a fiber optic cable, a coaxial cable) or may be a designated part of the electromagnetic spectrum, such as a radio or wireless communication channel. Further, as is also known in the art, prior to passing the information into the channel the information undergoes some form of modulation. One form of modulation is pulse amplitude modulation (PAM). With pulse amplitude modulation (PAM) samples of the information are taken and converted into pulses having amplitudes corresponding to the amplitudes of the sampled information signal. One form of PAM is baseband PAM. Baseband PAM is commonly used for wire pair communication channels where the signal spectrum is allowed to extend down to zero frequency (d.c.). Another form of PAM is passband PAM, commonly used in fiber, coaxial, and wireless communication channels.

In bi-directional communication systems, a transmitter and a receiver at one site are packaged together as a modulator/demodulator, or modem, for communication with another modem at another site through the communication channel. In one such system, the information to be transmitted (i.e., the stream of pulses having amplitudes related to the sampled information signal) is digitized into a stream of bits. The transmitter typically includes a coder for converting (i.e., mapping) an incoming stream of bits into a corresponding stream of data symbols. While a bit is either a logic 1 or a logic 0, the coder can map the bits into other symbols. For example, a simple coder may merely use the same binary code; i.e., a logic 1 maps into a 1 and a logic 0 maps into a 0. On the other hand, a more complicated coder may map a logic 0 into a −1 and a logic 1 into +1. A still more complicated coder may map a 00 bit sequence into −3, a 01 bit sequence into −1, a 10 bit sequence into 1, and a 11 bit sequence into 3. With a passband PAM having quadrature modulating carrier signals (a+jb), a coder may map a 00 bit sequence into +1, a 01 bit sequence into +j, a 10 bit sequence into −1, and a 11 bit sequence into −j. Since the coder may map multiple bits into a single data symbol, a distinction is made between symbol rate and bit rate, the former also being called the baud rate. Thus, if the coder maps n bits into a symbol with size mn, the baud rate is (1/m)th the bit rate.

Thus, with PAM, a sequence of continuous-time pulses is coded into a sequence of symbols. The sequence of symbols is passed through a transmit filter where the symbols are converted into a continuous-time signal for transmission to the receiver through the communication channel. Thus, for a transmit filter having a rectangular impulse response, with a sequence of symbols +3, +1, −3, +1 at a baud rate (1/T), the output of the transmit filter will have a level +3, followed T seconds later with a level +1, followed T seconds later with a level −3, followed T seconds later with a level +1. The receiver samples the signals fed to it from the communication channel. More particularly, the receiver needs to extract the discrete-time information (e.g., +3, +1, −3, +1) from the continuous-time waveform. Unfortunately, the continuous-time waveform is typically corrupted by the communication channel. In order to construct a discrete-time signal from the continuous-time signal, the receiver first extracts timing information using various synchronization techniques, reduces channel noise and distortion using filtering techniques and produces an estimate of the symbol sequence using a slicer. For example, assume that the symbol −3 is transmitted but because of channel corruption the symbol −3.56 is received by the slicer. The slicer makes a decision as to whether the received symbol, −3.56, is −3, −5, or −1. Here, for example, because the received symbol is closest to −3, the slicer produces an estimated output of −3.

Finally, the estimated symbol sequence produced by the slicer is converted into a bit stream using a decoder, or de-mapper, which performs the inverse mapping to the coder used in the transmitter. In this example, the de-mapper would convert the estimated output symbol −3 into 00.

One type of channel corruption results from linear amplitude and phase dispersion in the channel. This amplitude and phase dispersion results in the pulses broadening thereby causing intersymbol interference. To reduce, or ideally eliminate, intersymbol interference an adaptive filter is configured as a linear equalizer and such equalizer is sometimes used at the front-end of the receiver to compensate for channel amplitude and phase dispersion. Equalization techniques are described in a textbook entitled, *Digital Communication* by Edward A. Lee and David G. Messerschmidt published by Kluwer Academic Publishers, Boston/Dordrech/London 1988.

As is also known in the art, it is sometimes necessary to cancel, or filter, transmitted signals which echo back to the receiver. Thus, a local modem receiver receives a composite signal made up of the signal transmitted by a remote modem transmitter and an echo of the signal transmitted by the local modem transmitter.

One type of filter used to reduce channel noise and distortion (e.g., inter-symbol interference) and cancel echo signals is an adaptive filter; the former being referred to as a linear adaptive equalization filter, such as described in chapters 8 and 9 of the above referenced textbook, and the latter being referred to as an echo canceler, as described in chapter 18 of such textbook. Considering the linear equalizer, as described in chapter 9, since the characteristics of the channel are not known, a priori, adaptive equalizers are typically used. One form of adaptive equalizer includes a finite transversal filter with a finite number of coefficient weighting taps. The output of taps of the filter are summed to produce the filter output. The filter output is then fed to the slicer. The object of the adaptive equalizer is to adapt the weighting coefficients to minimize noise and intersymbol interference. The adaptation of the equalizer is driven by an error signal produced by subtracting the slicer input and the slicer output. The error signal indicates the direction that the coefficients must be moved to more accurately represent the data symbols at the slicer input. In the absence of intersymbol interference and noise, the slicer input would precisely equal the transmitted data symbols, and the slicer output would equal the slicer input; i.e., the error signal would be zero.

If there were noise alone at the slicer input, but no intersymbol interference, the error signal would be non-zero, but would average to zero resulting in no net change in the coefficients. When there is intersymbol interference, the resulting error signal is used to adjust the coefficients to reduce such intersymbol interference. Thus, because the slicer regenerates a noise- and intersymbol interference-free representation of the transmitted data symbols, a comparison of these symbols with the slicer input can be used to generate an error signal. The error signal is used in a feedback arrangement to adjust the coefficients properly so that noise and intersymbol interference are reduced.

One such adaptive equalizer is shown in FIG. 1. There, the adaptive equalizer 10 includes a finite impulse response (FIR) filter 12 having a plurality of serially coupled storage stages, or registers $18_{-M}$ to $18_{+M}$, a plurality of tap arithmetic units $20_{-M}$ through $20_{+M}$, and a summer, or adder, 13. Thus, the FIR 12 has 2M+1 taps, i.e., taps −M to +M, as shown.

After the incoming continuous-time signal is digitized by analog to digital converter (A/D) 16, the digitized samples, $r_n$, are fed sequentially to the input 17 of a finite impulse response filter (FIR) 12. The FIR 12 includes serially coupled registers $18_{-M}$ through $18_{+M}$, as shown. Thus, considering an exemplary one of the registers $18_{-M}$ through $18_{+M}$, here register $18_M$, such register stores sample, $r_{n-m}$, as shown. The output of each of the registers $18_{-M}$ through $18_{+M}$ is also fed to a corresponding one of the tap arithmetic units $20_{-M}$ through $20_{+M}$, respectively, as shown, for multiplication (i.e., weighting) by coefficients $c^{-M}{}_n$ through $c^{+M}{}_n$, respectively, selected, in a manner to be described, to reduce the effects of channel noise and intersymbol interference. The weighted stored samples produced by the tap arithmetic units $20_{-M}$ through $20_{+M}$ at taps $11_{-M}$ through $11_{+M}$ are summed in the summer (i.e, adder) 13 of the FIR 12 and the accumulated results (i.e., the output of the FIR 12) are fed to a slicer 14, as shown.

During an initial acquisition or training phase, the transmitter, not shown, generates, and transmits, via the channel, to the remote site receiver. The remote site receiver has, in the equalizer 10 thereof, a data symbol sequence known to the remote site receiver and stored in an internal symbol generator 24 of the receiver. Thus, during the initial training mode, a training mode signal on line 25 activates a multiplexer 26 so that the known symbol sequence stored in the internal symbol generator 24 passes to a differencing network (i.e., subtractor) 28 along with the output of the FIR 12. The output of the differencing network 28 is an error signal, $e_n$. The sign of the error signal, $e_n$, is determined by a comparator 29, as shown, and a one bit representation of the sign of $e_n$ (i.e., sgn $e_n$) is produced on line 41. The exponent of a time varying adaptation coefficient, $\beta$, is computed in a fixed to floating point converter 31 and the computed exponent of $\beta$ (i.e, b) is produced on bus 47, as shown. The exponent of $\beta$ (i.e., b) and the sign of $e_n$ (i.e., sgn $e_n$) are fed to tap arithmetic units $20_{-M}$ through $20_{+M}$, as shown. An exemplary one of the tap arithmetic units $20_{-M}$ through $20_{+M}$, here tap arithmetic units unit $20_m$, is shown to include a register 31 for storing the weighting coefficient, $c^m{}_n$, for the tap $11_m$. The data, i.e., sample $r_{n-m}$, stored in the register $18_m$ for the tap $11_m$ is fed to a coefficient update multiplier 32 along with the exponent of $\beta$ (i.e., b) and the sign of $e_n$ (i.e., sgn $e_n$). More particularly, the multiplier 32 includes: a shifter 76 which shifts the bits of the data sample $r_{n-m}$ a number of bits equal to the exponent, b, on bus 47; and, a multiplier 77 which multiplies the output of the shifter 47 by +1 or −1 in accordance with the sign of the error signal $e_n$ on line 41. The output of the multiplier 77 (i.e., the output of multiplier 32) is subtracted in subtractor 33 from the present coefficient, $c^m{}_n$, now stored in the register 31 to produce the next coefficient, $c^m{}_{n+1}$, to be used by the FIR 12. The present coefficient, $c^m{}_n$, stored in register 31 is used for weighting (i.e., multiplication in weighting multiplier 34) the data, $r_{n-m}$, stored in the register $18_m$. The resulting product produced by weighting multiplier 34 is the weighted data output of tap $11_m$, i.e., $c^m{}_n r_{n-m}$.

Thus, it follows that if the symbol sequence transmitted and filtered by FIR 12 (i.e., the output of FIR 12) and the symbol sequence, an, produced by the slicer 14 are the same, the output of the slicer 14, $a_n$, properly represents the transmitted data and the error signal, $e_n$, is zero. If, on the other hand, the error signal, $e_n$, is not zero, the FIR 10 adjusts the coefficients $c^{-M}{}_n$ through $c^{+M}{}_n$, in a feedback loop nulling arrangement to drive the error signal, $e_n$, towards zero. Thus, ideally at the end of the training mode, the registers $18_{-M}$ through $18_{+M}$ will store coefficients $c^{-M}{}_n$ through $c^{-M}{}_n$, respectively, to produce an error signal, $e_n$, of zero and therefore the characteristics of the FIR 12 will be "matched" to the characteristics of the transmission channel. Thus, once the a priori agreed upon training mode has elapsed, the signal on line 25 is changed and the slicer 14 output is gated out of the equalizer 10 via gate 38 and the slicer 14 output is used by the receiver during the normal operating mode. If any error signal, $e_n$, results from changes in the characteristic in the channel, the error signal, $e_n$, after modification by the adaptation coefficient, $\beta$, (i.e. $\beta e_n$) is used as a feedback signal to adjust the coefficients $c^{-M}{}_n$ through $c^{+M}{}_n$ so that the error signal $e_n$ is driven towards zero, i.e, so that the equalizer 10 removes the effects of channel noise and intersymbol interference producing effects.

The system described in FIG. 1, however, has not been found to provide adequate reduction of channel noise and intersymbol interference because approximating the error $e_n$ to only its sign is insufficient, particularly for small errors. That is, with small values of error ($e_n$) there are system instabilities leading to poor signal-to-noise ratios (SNRs). In an attempt to compensate for these instabilities, the value of the adaptation coefficient was reduced over time in several steps. The adaptation of the equalizer, however, depended on the nature of the channel. Using a particular sequence for reducing the adaptation coefficient, unfortunately, did not work adequately on certain channels.

In order to improve the performance of the system 10 (FIG. 1), the system was modified into the system 10' shown in FIG. 2. It is first noted that elements in the system 10' which are the same as the elements in system 10 are designated using the same numerical designation. Here, it is noted, that the output of differencing network 28, $e_n$, is fed, via an adaptation coefficient, $\beta$, multiplier 30, to the tap arithmetic units $20'_{-M}$ through $20'_{+M}$, as shown. The error $e_n$ produced by the differencing network 28 and the adaptation coefficient, $\beta$, are in fixed point format. Both are fed to a fixed point, coefficient update multiplier 30, as shown. The product, $\beta e_n$, is in fixed point format and is fed to a fixed point multiplier 32' along with the data, i.e., sample, $r_{n-m}$, stored in the register $18_m$ for the tap $11_m$. The output of the multiplier 32' is subtracted in subtractor 33' from the present coefficient, $c^m{}_n$, now stored in the register 31 to produce the next coefficient, $c^m{}_{n+1}$, to be used by the FIR 12'. The present coefficient, $c^m{}_n$, stored in register 31 is used for weighting (i.e., multiplication in weighting multiplier 34) the data, $r_{n-m}$, stored in the register $18_m$. The resulting product produced by weighting multiplier 34 is the weighted data output of tap $11_m$, i.e., $c^m{}_n r_{n-m}$.

The adaptation process may be described by the following equations:

$$e_n = \left[\sum_{m=-M}^{Mr} c_n^m r_{n-m}\right] - a_n \quad (1)$$

$$c_{n+1}^m = c_n^m - [\beta \cdot e_n \cdot r_{n-m}] \quad (2)$$

Here:
  $e_n$ is the error signal produced by differencing network 28;
  $c_n^m$ is the m-th tap equalizer coefficient;
  $r_{n-m}$ is the received data sample and stored in the register 18$_m$;
  $a_n$ is the sliced data (i.e., output of slicer 14; and
  $\beta$ is the adaptation coefficient.
  (The subscripts indicate the sample time value.)

Referring to FIG. 2, the error signal, $e_n$, is computed in equation (1) as the difference between the output of the FIR filter 12' and the output of the slicer 14. The update of the FIR 12' coefficients is performed using equation (2). Thus, FIG. 2 shows the block diagram for an exemplary one of the plurality of tap arithmetic units, here tap arithmetic unit 20'$_m$, which implements the equalizer operation described by (1) and (2). The coefficients are stored in registers 31. There are two multipliers; an update multiplier 32' and a weighting multiplier 34. Weighting multiplier 34 performs the multiplication of the coefficient with data stored in register 18$_m$ for the partial FIR result, i.e., equation (1), and update multiplier 32' performs the multiplication of the error, $e_n$, with data stored in register 18$_m$ necessary for coefficient update as in equation (2).

The data stored in the registers 18 and 31 are in fixed point format. Typical values are 10–12 bits for data stored in register 18$_m$, 18–20 bits for coefficient register 31. Only the 12 most significant bits are used by the multiplier 34, 18 bits for the error $\beta e_n$ because the value of the error, $e_n$, decreases significantly during the adaptation process. Therefore, the sizes of the two multipliers 32', 34 are 12×18=216 bits for update multiplier 32' and 12×12=144 bits for coefficient multiplier 34.

With an echo canceler, a composite signal made up of the signal transmitted by a remote modem transmitter and an echo of the signal transmitted by the local modem transmitter is fed to a differencing network. Also fed to the difference network is the output of a finite impulse response filter (FIR). The FIR is fed by the data being transmitted by the local transmitter. An error signal is produced by the differencing network and is fed to the FIR filter to modify the coefficients thereof in a manner similar to the operation of the FIR described above in connection with FIGS. 1 and 2. Therefore, ideally the echo canceler removes the local transmitter portion of the received composite signal from such composite received signal to produce at the output of the differencing network a signal representative of the signal transmitted by the remote modem transmitter albeit corrupted with any intersymbol interference and noise. The output of the differencing network is typically fed to a linear equalizer to reduce such intersymbol interference and noise.

SUMMARY OF THE INVENTION

In accordance with the invention, a method is provided for adaptive filtering for use in a communication system. The method includes the step of modifying coefficients of a finite impulse response filter fed by a sequence of digital samples of information in accordance with an error signal provided to the filter in floating point format.

With such method, it has been found that suitable filtering may be provided by representing the error signal with only a one bit approximation. Thus, multiplication in the filter may be performed using a shifter. When formed as an integrated circuit chip, a significant reduction of semiconductor chip area is reduced as compared with fixed point multipliers for the coefficients of the FIR, accompanied by a similar reduction in power dissipation.

In a preferred embodiment, the floating point error signal comprises only a sign bit and an exponent term.

In accordance with another feature of the invention, the method includes the step of combining the exponent of the error signal with an exponent of an adaptation coefficient to produce a composite signal and the step of modifying the coefficients of the finite impulse response filter comprises the step of modifying such coefficients in accordance with the composite signal.

In accordance with another feature of the invention, the finite impulse response filter filters the sequence of digital samples fed thereto to produce a sequence of outputs in fixed point format. An error signal is produced in fixed point format in accordance with a difference between the outputs produced by the finite impulse response filter and a sequence of digital samples. The error signal is converted from a fixed format to the floating point error signal provided to finite impulse response filter.

In accordance with the present invention, a digital communication system is provided wherein a pair of modems communicate through a channel. One of the modems includes a receiver having an adaptive filter. The adaptive filter includes a finite impulse response filter fed: by a sequence of digital samples of information; and an error signal in floating point format, for producing a sequence of outputs in fixed point format. An error signal generator is provided for producing an error signal in fixed point format in accordance with a difference between the outputs produced by the finite impulse response filter and a sequence of digital samples. A fixed to floating point converter is provided for converting the fixed point format error signal into the floating point format error signal fed to finite impulse response filter.

In a preferred embodiment of the invention the error signal is converted into a floating point number having only a sign bit and an exponent term.

In accordance with another feature of the invention, a digital communication system is provided wherein a pair of modems communicate through a channel. One of the modems includes a receiver having an adaptive filter. The adaptive filter includes a finite impulse response filter fed by a sequence of digital samples and a composite error signal in floating point format for producing a sequence of outputs in fixed point format. An error signal generator is provided for producing an error signal in fixed point format in accordance with a difference between the outputs produced by the finite impulse response filter and a sequence of digital samples. A fixed to floating point converter is provided for converting the fixed point format error signal into a floating point format error signal having a sign bit and an exponent. An adder is provided for adding the error signal exponent to an exponent of an adaptation coefficient to produce the composite signal.

In accordance with another feature of the invention, the finite impulse response filter includes an update floating point multiplier fed by: a digital sample; and, the composite error signal and the sign bit of the error signal, for producing an update weighting coefficient in fixed point format.

BRIEF DESCRIPTION OF THE DRAWING

These and other features and advantages of the invention will become more readily understood when read together with the following detailed description taken together with the accompanying drawings, where.

DESCRIPTION OF THE PREFERRED EMBODIMENTS

Figure 3:
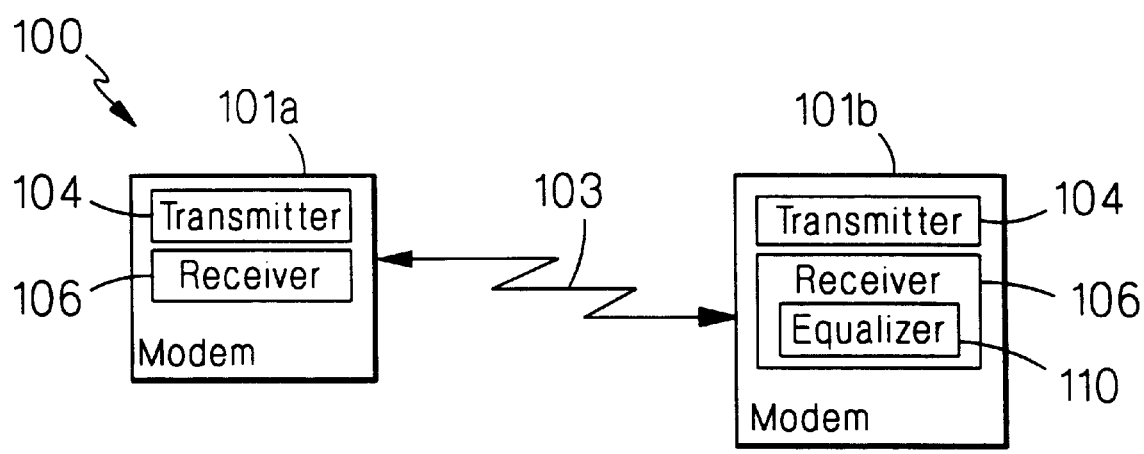
FIG. 3 is a block diagram of a communication system having an adaptive filter in accordance with the invention, such adaptive filter being configured as an equalizer in accordance with the invention.
Figure 4A:
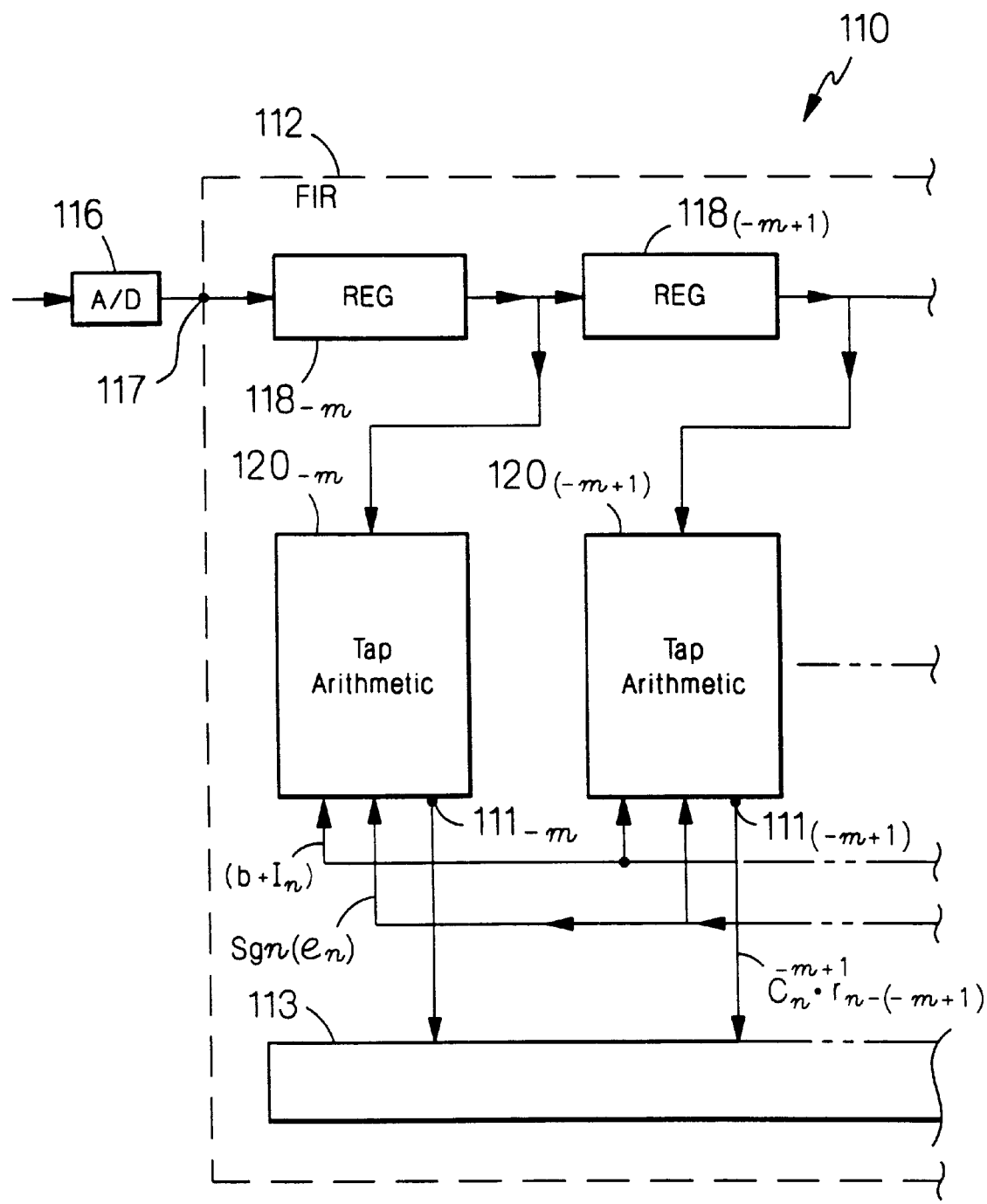
Figure 4B:
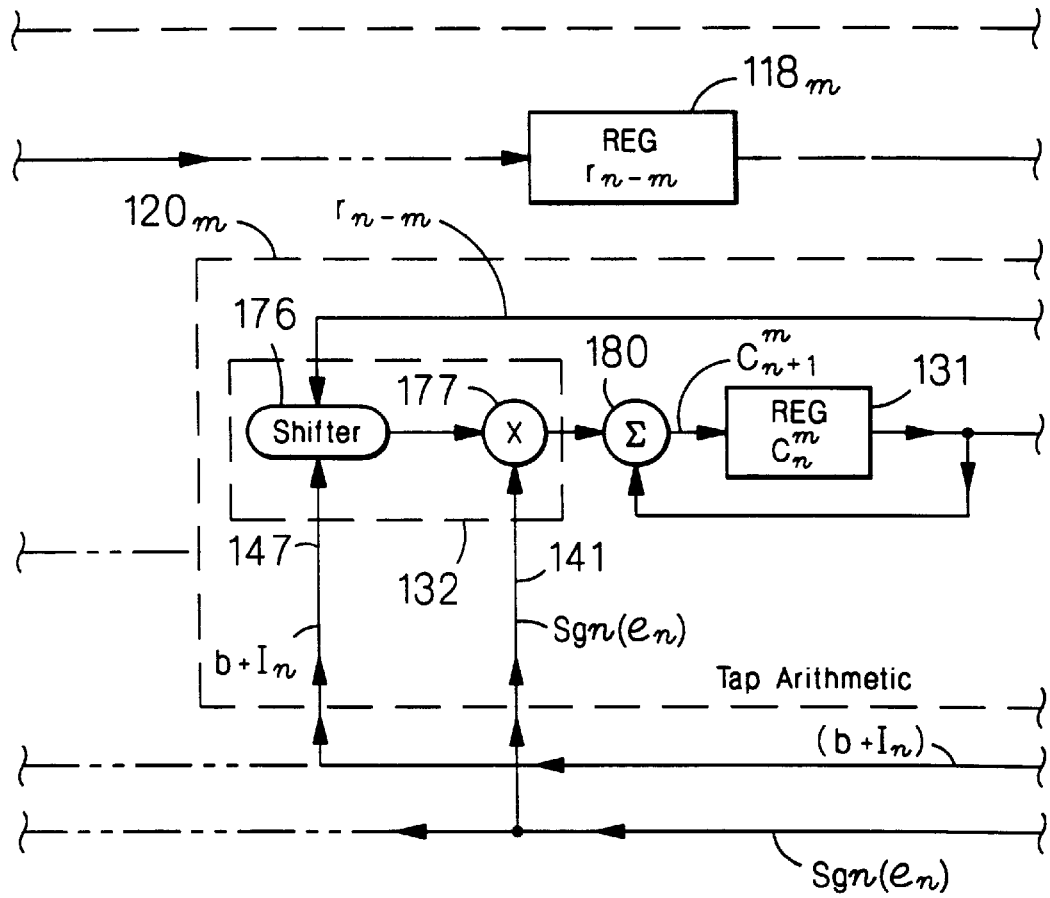
Figure 4B:
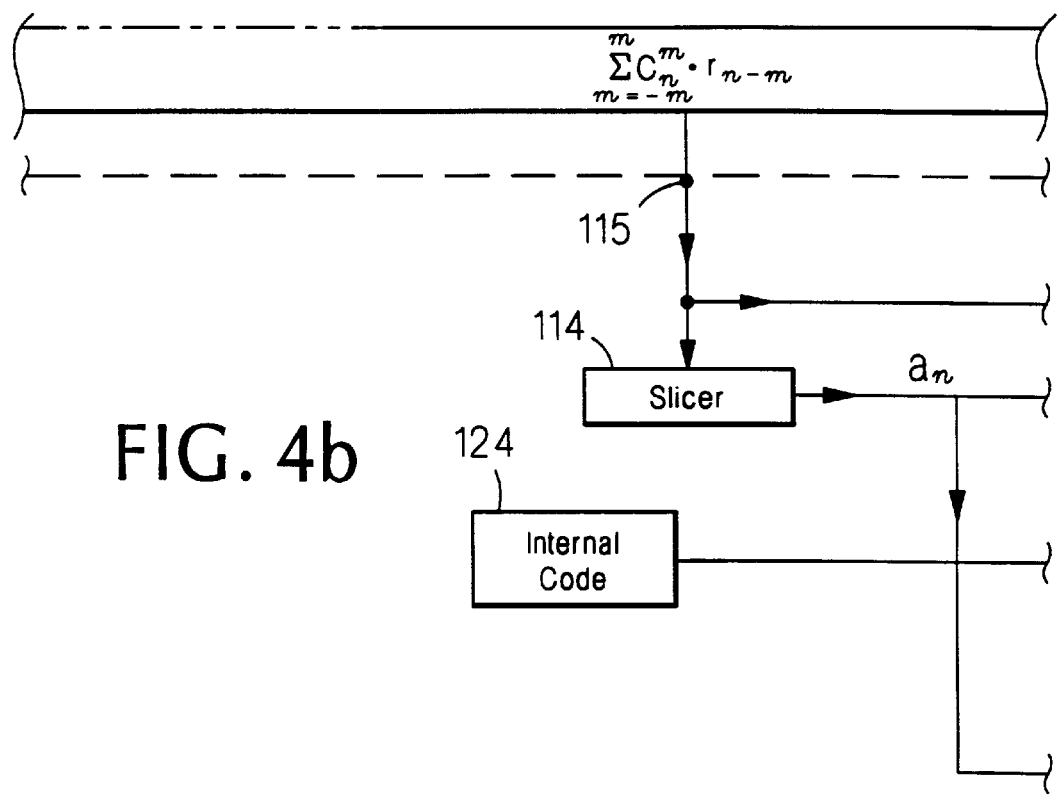
Figure 4C:
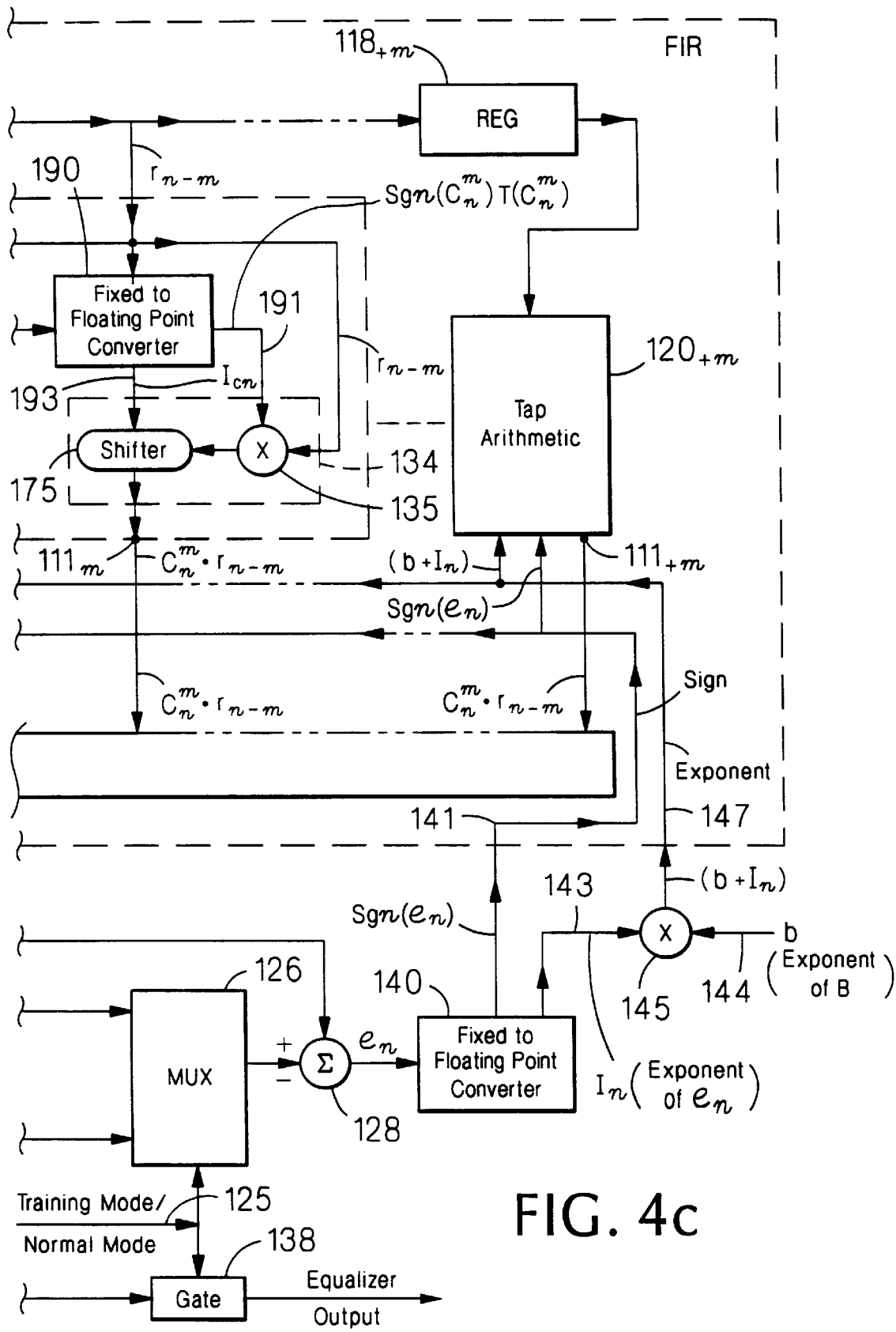

Referring now to FIG. 3, a digital communication system 100 is shown to include a pair of modems 101a, 101b interconnected for communication over a communication channel 103. Each one of the modems 101a, 101b include a transmitter 104 and a receiver 106. The receiver 106 includes a linear equalizer 110, shown in more detail in FIG. 4. As shown in FIG. 4, the linear equalizer 110 includes a finite impulse response (FIR) filter 112 fed by a sequence of digital samples of information received by the receiver 106 from the channel 103. The filter 112 includes a plurality of serially coupled storage stages (i.e., registers) $118_{-M}$ through $118_{+M}$ for storing the sequence of the digital samples, $r_n$, in fixed point format. Thus, considering an exemplary one of the registers $118_{-M}$ through $118_M$, here register $118_m$, such register stores sample, $r_{n-m}$, as shown. The output of each of the registers $118_{-M}$ through $118_M$ is also fed to a corresponding one of the tap arithmetic units $120_{-M}$ through $120_M$, respectively, as shown, for multiplication (i.e., weighting) by coefficients $c^{-M}{}_n$ through $c^{+M}{}_n$, respectively, selected, in a manner to be described, to reduce the effects of channel noise and intersymbol interference. Each one of the tap arithmetic units $120_{-M}$ through $120_{+M}$ is fed by a corresponding one of the storage stages $118_{-M}$ through $118_{+M}$, respectively, as shown. Each one of the tap arithmetic units $120_{-M}$ through $120_{+M}$ weights a current digital sample stored in the storage stage $118_{-M}$ through $118_{+M}$ coupled thereto. Thus, exemplary storage stage $118_m$ stores sample $r_{n-m}$ and such sample, $r_{n-m}$ is weighted by a current weighting coefficient, $c^m{}_n$, to produce a current weighted digital sample, $c^m{}_n r_{n-m}$ in fixed point format at the taps $111_{-M}$ through $111_{+M}$, respectively, as shown.

Each one of the tap arithmetic units $120_{-M}$ through $120_{+M}$ includes an update floating point multiplier 132 to be described in detail hereinafter. Suffice it to say here, however, that the update floating point multiplier 132 is fed by the current digital sample, $r_n$, stored in the coupled storage stage $118_{-M}$ through $118_{+M}$; and, a floating point format error signal, $e_n$, produced at the output of fixed to floating point converter 140 (after being scaled by adaptation coefficient, β) to produce an update weighting coefficient, $βe_n$, in floating point format.

More particularly, the fixed to floating point converter 140 produces a sign bit (i.e., sgn($e_n$)) for the floating point format error signal, $e_n$, on line 141, and the exponent ($I_n$) of the floating point format error signal, $e_n$, on bus 143. Here, the number of bits on bus 143 is typically 3 or 4 bits. The exponent of the error signal (i.e., $I_n$) on bus 143 is added to the exponent, b, of the adaptation coefficient, β, on bus 144 in an adder 145 to produce the sum thereof (i.e., $b+I_n$) on bus 147. The number of bits on bus 147 is here typically 3 to 5 bits.

Thus, exemplary tap arithmetic unit $120_m$ includes a register 131 for storing the current coefficient, $cm^m{}_n$, in fixed point format for use as the weighting coefficient for the digital sample, $r_{n-m}$, stored in the coupled storage stage storage stage $118_m$. The floating point multiplier 132 and adder 180 produce the coefficient $c^m{}_{n+1}$ to be used for weighting the next digital sample, $r_{(n+1)-m}$ to be stored in register $118_m$. Each one of the tap arithmetic units $120_{-M}$ through $120_{+M}$ also includes a weighting multiplier 134. The weighting multiplier 134 may be either a fixed point multiplier or, a floating point multiplier, as shown, and which will be described in detail hereinafter. Suffice it to say here, however, that the weighting multiplier 134 is fed by the current weighting coefficient, $c^m{}_n$, stored in register 131, and the current digital sample, $r_{n-m}$, stored in the coupled storage stage $118_m$ to thereby produce the current weighted digital sample $c^m{}_n r_{n-m}$ in fixed point format at tap $111_m$.

The finite impulse response filter 112 also includes a summer, or adder 113 for summing the current weighted digital samples produced by the plurality of tap arithmetic units $120_{-M}$ through $120_{+m}$ at taps $111_{-M}$ through $111_{+M}$ to produce a sequence of outputs at FIR 112 output 115 in fixed point format. Thus, the FIR 112 filters the sequence of digital point samples fed to input 117 thereof by the A/D converter 116 and produces a sequence of outputs at output 115. The outputs at output 115 are in fixed point format.

The equalizer 110 includes a slicer 114 fed by the finite impulse response filter 112 at output 115 for converting the outputs into estimated output symbols in fixed point format. The equalizer 110 also includes an error signal generator 128 for producing an error signal, $e_n$, in fixed point format in accordance with a difference between the outputs produced by the finite impulse response filter 112 at output 115 and the estimated output symbols, $a_n$, produced by the slicer 114. As noted above, the fixed to floating point converter 140 converts the fixed point format error signal into the floating point format error signal fed to the update floating point multiplier 132 (i.e., the sign bit on line 114 and the exponent, $I_n$ on bus 143).

More particularly, the finite impulse response filter 112 includes a plurality of taps, $111_{-M}$ through $111_{+M}$. Thus, here, the FIR 112 has 2M+1 taps, from -M to +M, as shown. The output of the FIR 112 (i.e., output 115) is fed to the slicer 114. After the incoming continuous-time signal is digitized by analog to digital converter (A/D) 116, the digitized samples, $r_n$, are fed sequentially to serially coupled registers $118_{-M}$ through $118_M$, as shown. The output of each of the registers $118_{-M}$ through $118_M$ are also fed to tap arithmetic units $120_{-M}$ through $120_M$, respectively, as shown, for multiplication (i.e., weighting) by coefficients $c^{-M}{}_n$ through $c^{-M}{}_n$, respectively, selected in a manner to be described to reduce the effects of channel noise and intersymbol interference. The weighted stored samples produced by the tap arithmetic units $120_{-M}$ through $120_M$ at taps $111_{-M}$ through $111_{+M}$ are summed in adder 113 of the FIR 112 and the accumulated results (i.e., the output of the FIR 112) are fed to the slicer 114, as shown.

During an initial acquisition or training phase, the transmitter 104 in modem 101a (FIG. 3) generates, and transmits, via the channel 103, to the remote site modem 101b receiver 106 having the equalizer 110, a data symbol sequence known to the remote site 101b receiver 106 and stored in an internal symbol generator 124 of modem 101b receiver 106. Thus, during the initial training mode, a training mode signal on line 125 activates a multiplexer 126 so that the known symbol sequence stored in the internal symbol generator 124 passes to a differencing network (i.e., subtractor) 128 along with the output of the FIR 112. The output of the differencing network (subtractor) 128, the error signal, $e_n$, is converted into floating point format by the fixed to floating point converter 140, as described above. The sign bit, sgn $(e_n)$ is fed to the tap arithmetic units $120_{-M}$ through $120_{+M}$ via line 141 and the exponent $(I_n)$ is added to the exponent, b, of the adaptation coefficient, $\beta$, in adder 145 to produce the sum $b+I_n$ with such sum being fed to the tap arithmetic units $120_{-M}$ through $120_{+M}$ via bus 147.

An exemplary one of the tap arithmetic units $120_{-M}$ through $120_M$, here tap arithmetic unit $120_m$, is shown to include a register 131 for storing the weighting coefficient, $c^m{}_n$, for the tap $111_m$. The data, i.e., sample, $r_{n-m}$, stored in the storage stage $118_m$ for the tap $111_m$ is fed to a coefficient update floating point multiplier 132 along with the adaptation multiplied error signal, $\beta e_n$, expressed as $b+I_n$ on bus 147 and the sign bit sgn($e_n$) on line 141. The product is subtracted in subtractor 180 from the present coefficient, $c^m{}_n$, now stored in the register 131 to produce the next coefficient, $c^m{}_{n+1}$, to be used by the FIR 112. The present coefficient, $c^m{}_n$, stored in register 131 is used for weighting (i.e., multiplication in weighting multiplier 134) the data, $r_{n-m}$, stored in the storage stage $118_m$. The resulting product produced by weighting multiplier 134 is the weighted data output of tap 111m, i.e., $c^m{}_n r_{n-m}$.

Thus, it follows that if the symbol sequence transmitted and filtered by FIR 112 (i.e., the output of FIR 112) and the symbol sequence produced by the slicer 114, $a_n$, are the same, the output of the slicer 114 properly represents the transmitted data and the error signal, $e_n$, is zero. If, on the other hand, the error signal, $e_n$, is not zero, the FIR 110 adjusts the coefficients $c_{-Mn}$ through $c^{+M}{}_n$, respectively, in a feedback loop nulling arrangement to drive the error signal, $e_n$, towards zero. Thus, ideally at the end of the training mode, the registers $118_{-M}$ through $118_{+M}$ will store coefficients $c_{-Mn}$ through $c^{+M}{}_n$, respectively, to produce an error signal, $e_n$, of zero and therefore the characteristics of the FIR 112 will be "matched" to the characteristics of the transmission channel 103. Thus, once the a priori agreed upon training mode is completed, the signal on line 125 changes and the slicer 114 output is gated out of the equalizer 110 via gate 138 and the slicer 114 output is used by the receiver during the normal operating mode. Further, the error signal, $e_n$, will be the difference between the slicer 114 output and the slicer 114 input (i.e., the output 115 of the FIR 112). If any error signal, $e_n$, results from changes in the characteristic in the channel 103, the error signal, after modification by the adaptation coefficient, $\beta$, (i.e. $\beta e_n$) is used as a feedback signal to adjust the coefficients $c^{-M}{}_n$ through $c^{+M}{}_n$, respectively, so that the error signal $e_n$ is driven towards zero, i.e, so that the equalizer 110 removes the effects of channel 103 noise and intersymbol interference.

Figure 1A:
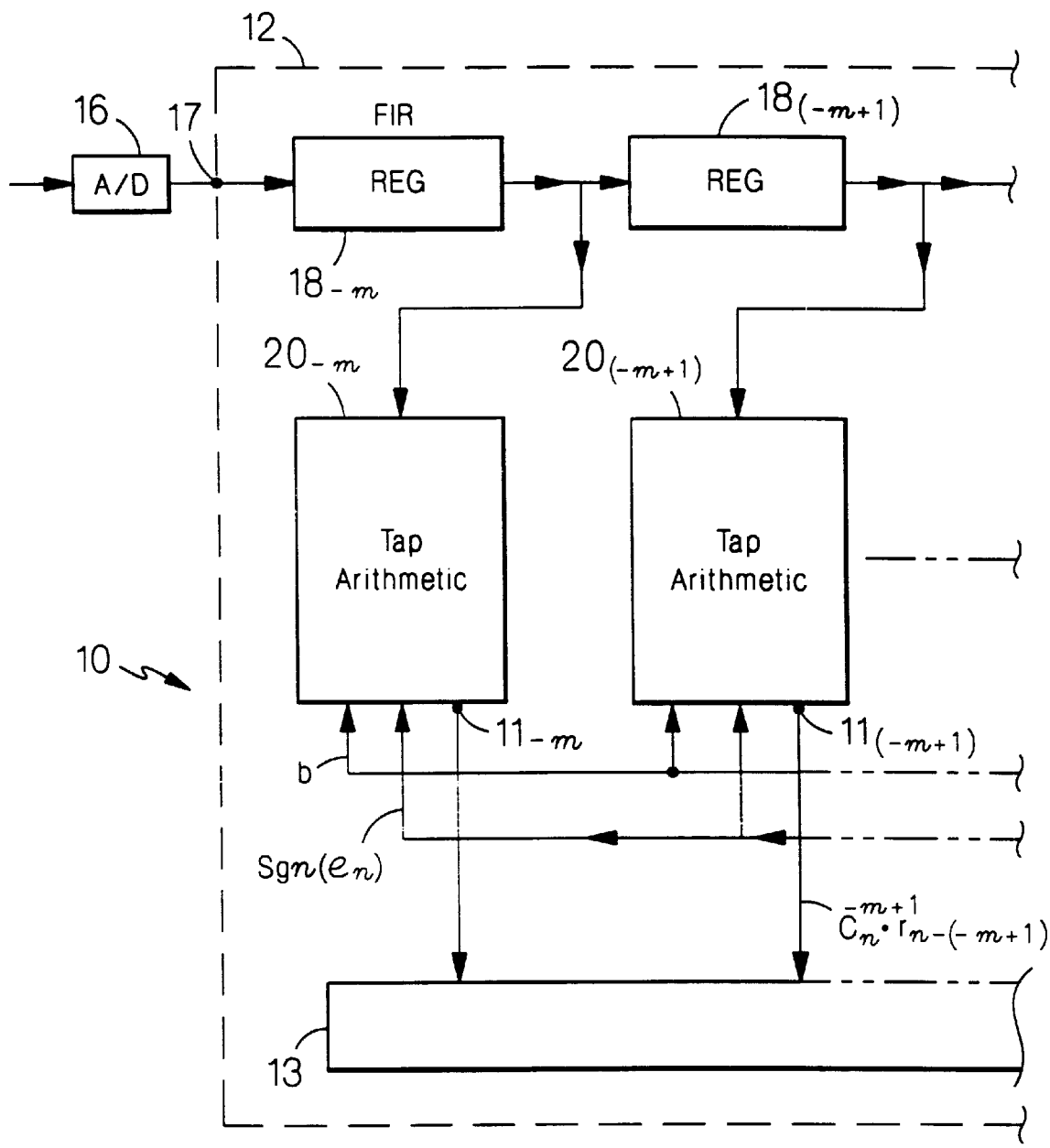
FIG. 1 is a block diagram of an equalizer in accordance with the PRIOR ART.
Figure 1B:
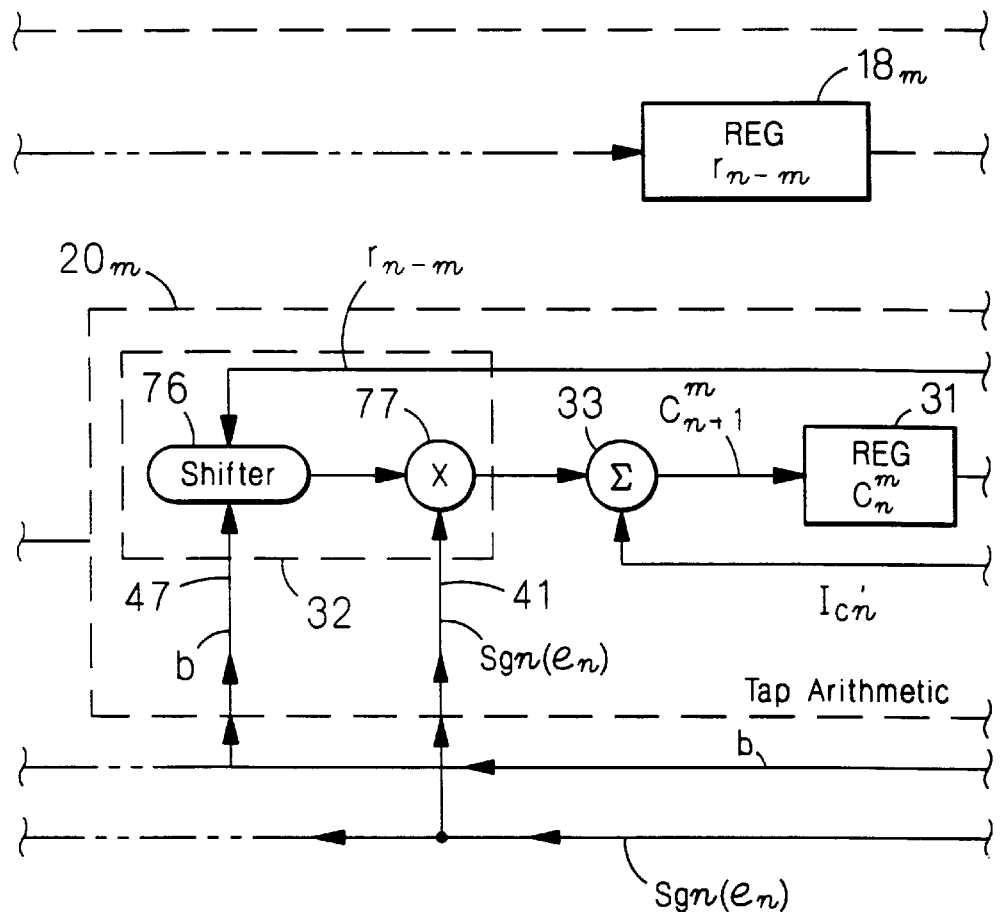
Figure 1B:
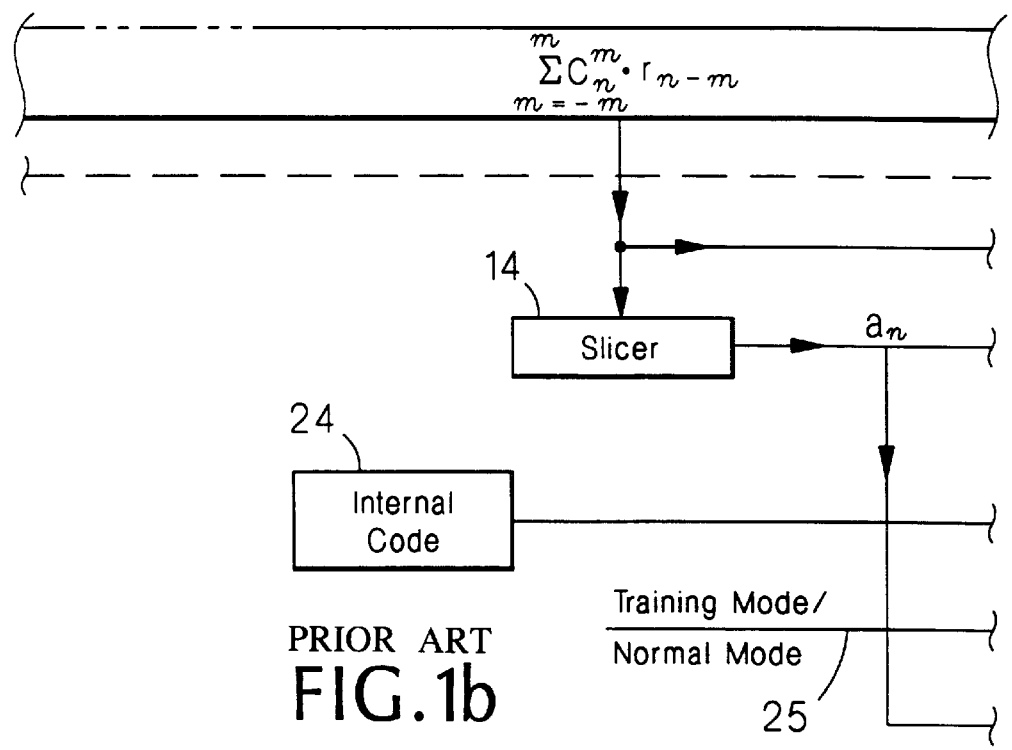
Figure 1C:
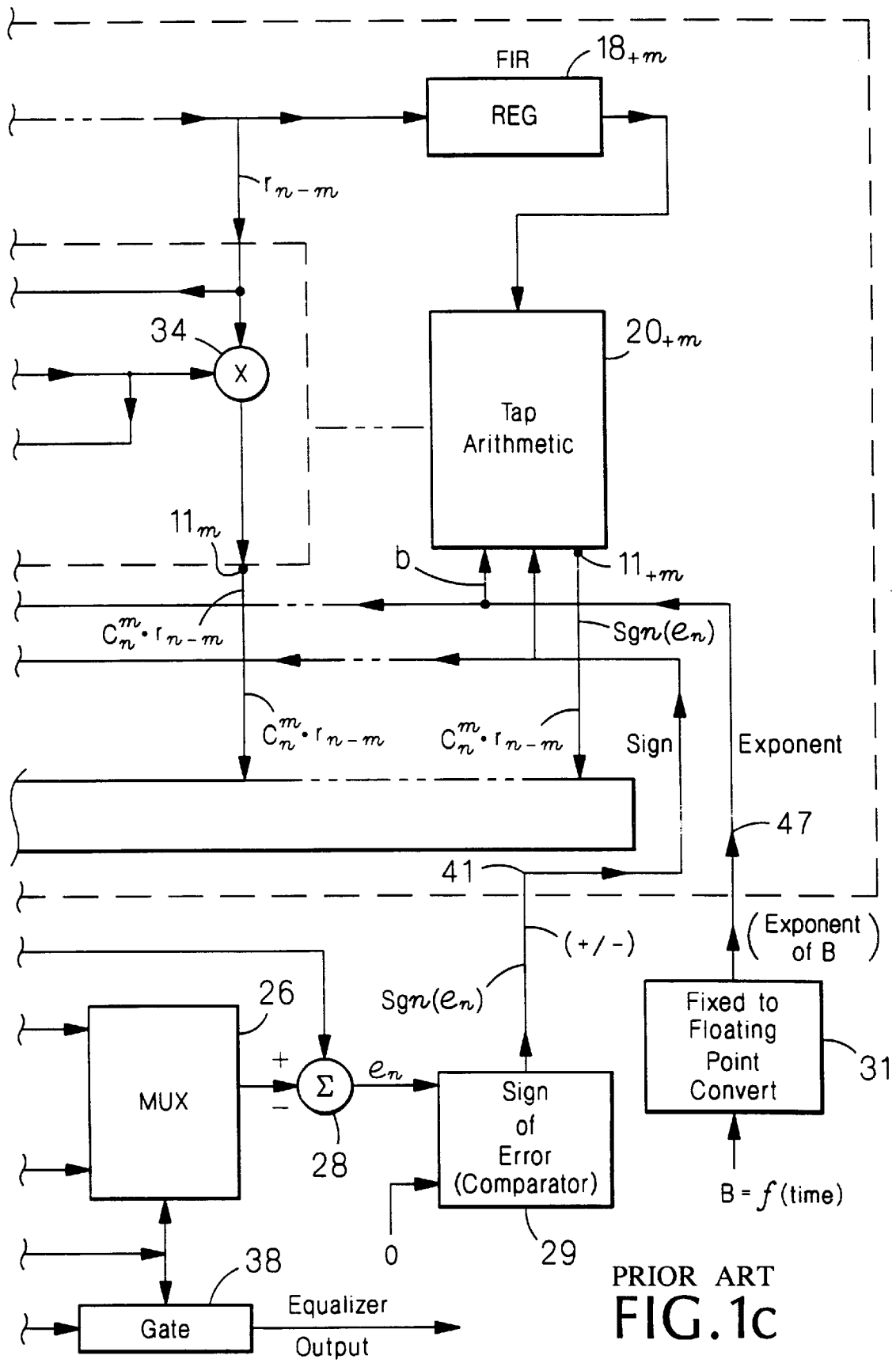
Figure 1D:
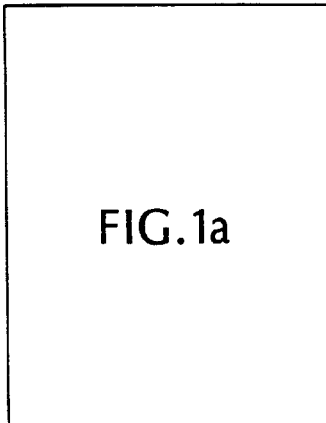
Figure 1D:
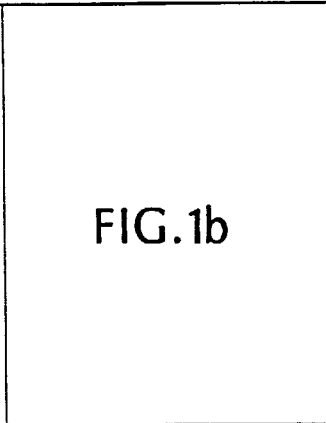
Figure 1D:
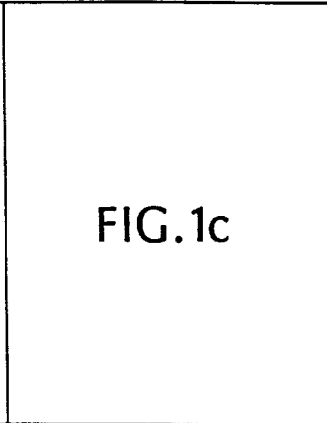
Figure 2C:
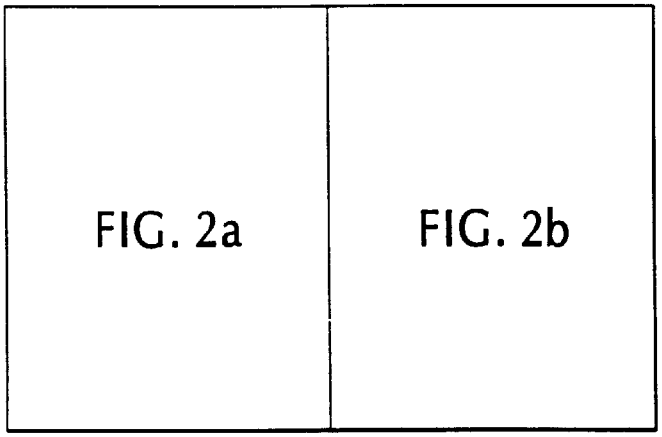
FIG. 2 is a block diagram of an equalizer in accordance with the PRIOR ART.
Figure 4D:
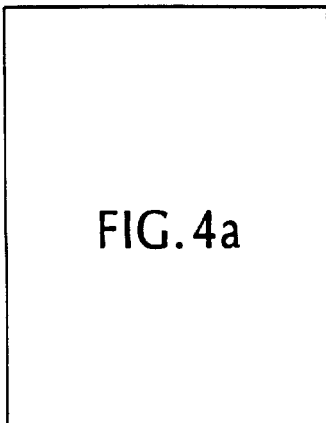
FIG. 4 is a block diagram of the adaptive filter of FIG. 3 configured as the equalizer of FIG. 3.
Figure 4D:
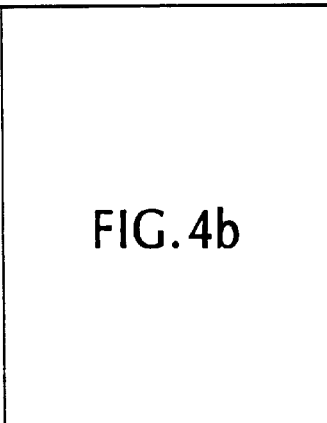
Figure 4D:
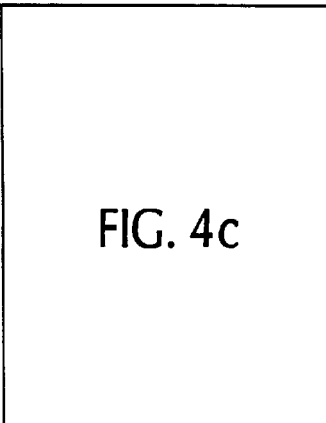
Figure 2A:
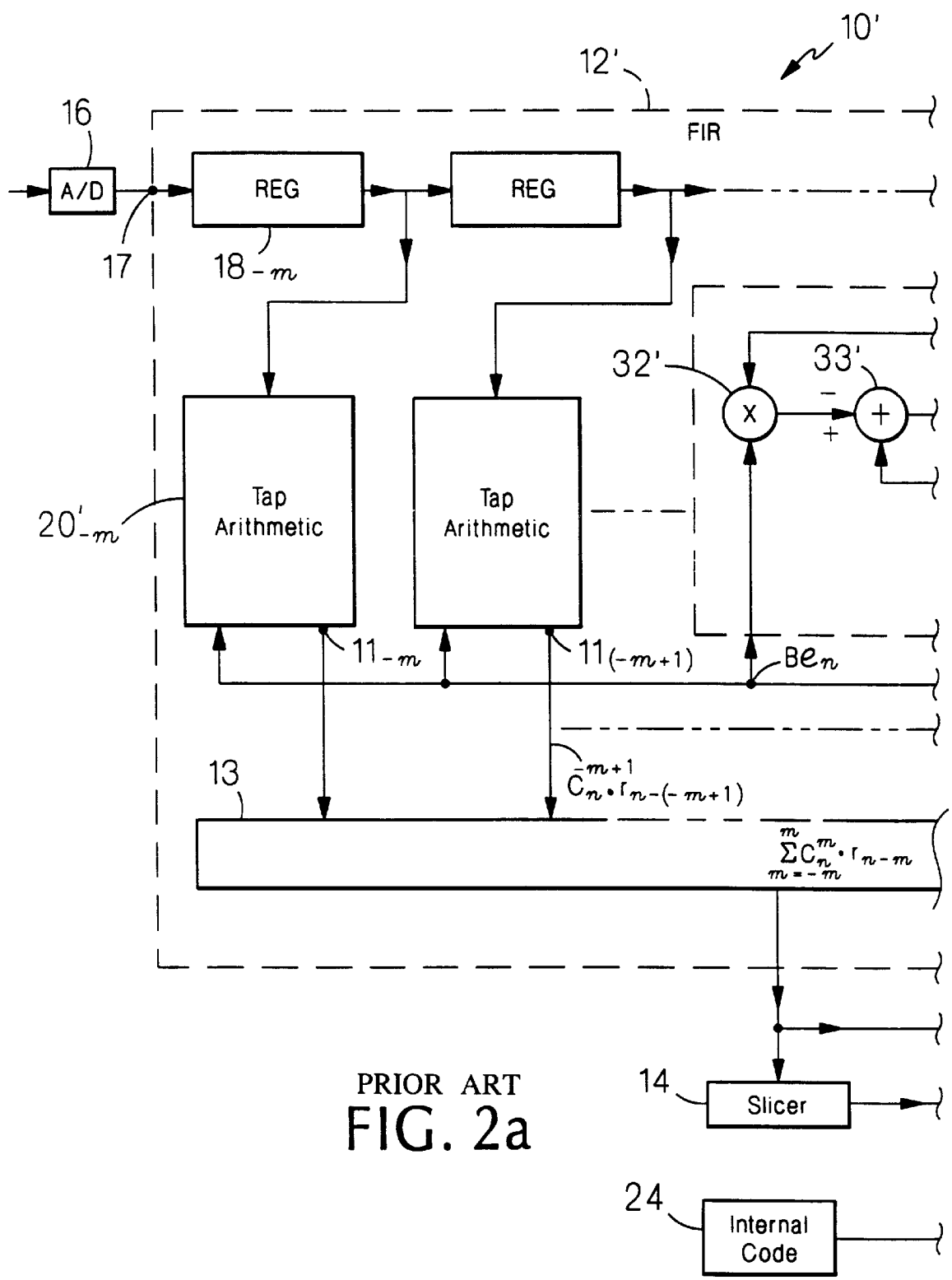
Figure 2B:
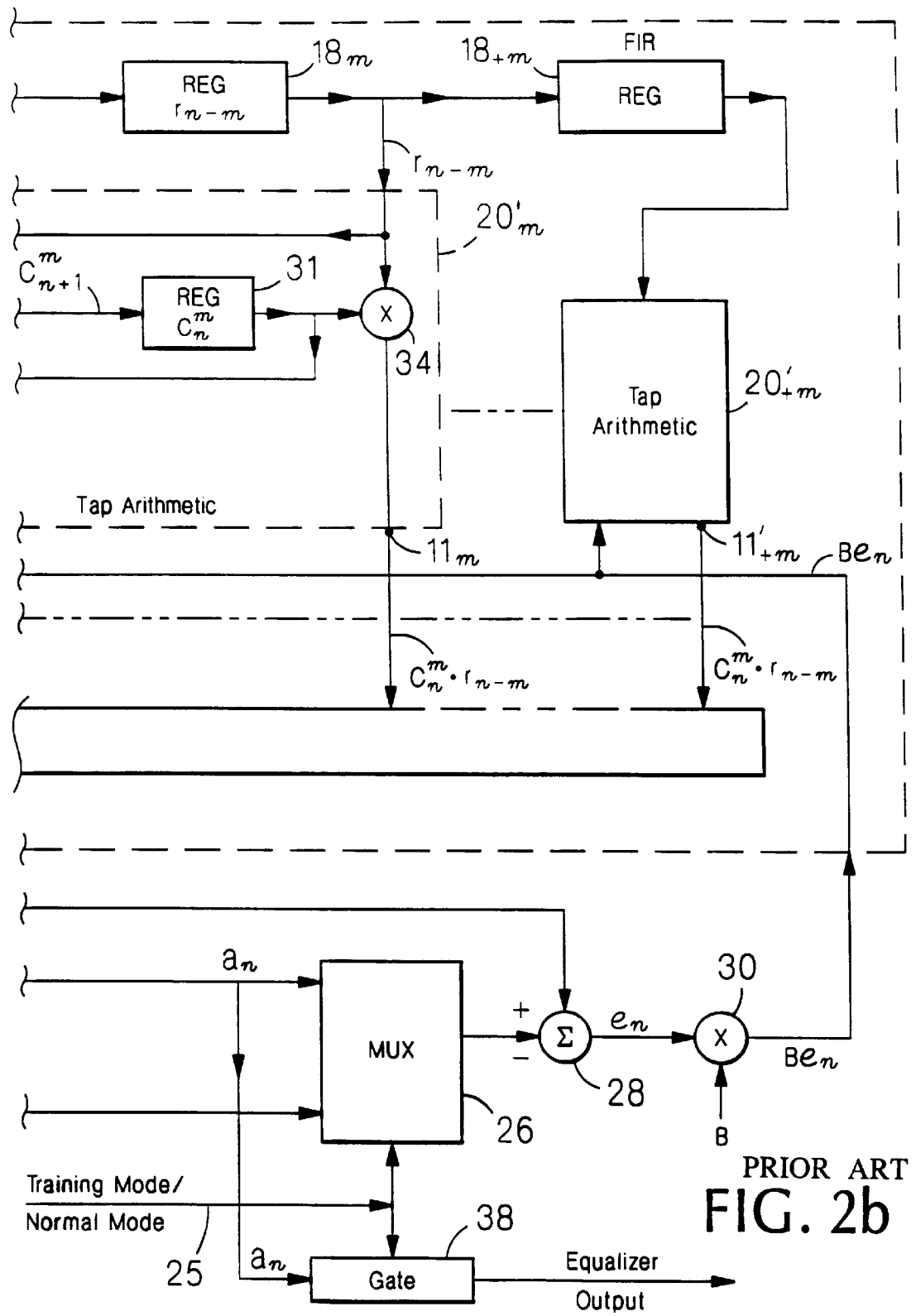

It is noted that here, however, unlike the PRIOR ART equalizer 10 described above in connection with FIG. 2, the linear equalizer 110 in FIG. 4 includes a finite impulse response filter 112 fed by a sequence of digital samples of information received by the receiver from the channel 103 and an error signal in floating point format for producing a sequence of outputs at output 115 in fixed point format. The slicer 114 is fed by the finite impulse response filter 112 for converting the output 115 into estimated output symbols, $a_n$, in fixed point format. The error signal generator 128 is provided for producing an error signal, $e_n$, in fixed point format in accordance with a difference between the outputs at 115 produced by the finite impulse response filter 112 and the estimated output symbols, $a_n$, produced by the slicer 114. The fixed to floating point converter 140 is provided for converting the fixed point format error signal, $e_n$, into the floating point format error signal fed to finite impulse response filter as a sign bit, sgn ($e_n$) on line 141 and as an exponent, $I_n$, on bus 143 which is added to the exponent, b, of the adaptation coefficient, $\beta$ in summer 145 to produce $b+I_n$ on bus 147.

Thus, such equalizer 110 provides compensation for amplitude and phase dispersion, as well as noise, in the communication channel 103 by modifying coefficients of the finite impulse response filter 112 fed by a sequence of digital samples of information from the channel 103 in accordance with an error signal in floating point format.

Considering now the update floating point multiplier 132 of an exemplary one of the tap arithmetic units $120_{-M}$ through $120_{+M}$, here tap arithmetic unit $120_m$, it is first noted that such multiplier 132 includes a shifter 176 responsive to the exponent portion (i.e., $b+I_n$) of the floating point error signal $\beta e_n$ produced on bus 147 and a multiplier 177 fed by the sign bit sgn($e_n$) on line 132. The fixed point data, $r_n$, stored in the storage stage $118_{-M}$ through $118_{+M}$ coupled thereto (i.e., storage stage $118_m$) is also fed to the shifter 176. Thus, the shifter 176 shifts the fixed point current data, $r_{n-m}$, stored in storage stage $118_m$, a number of bits commanded by the exponent portion of the error signal $\beta e_n$ (i.e., $b+I_n$) on bus 147. The resulting data is fed to the multiplier 177. The output of the multiplier 177 (i.e., the output of the floating point multiplier 132) is fed to subtractor 180. Also fed to the subtractor 180 is the data stored in the register 131. Thus, the sign bit (sgn($e_n$)) of the floating point error signal, $e_n$, selects whether the subtractor 180 is to either add (i.e., when the sign bit is negative) the output of the shifter 176 to the data stored in register 131 or to subtract the output of the shifter 176 (i.e., when the sign bit is positive) from the data stored in register 131. (It is noted that the multiplier 177 and the subtractor (i.e., differencing network) 180 may be combined into a single unit the output of which is fed to the register 131.) The output of the subtractor 180 is the next weighting coefficient to be stored in the register 131 for weighting the next successively stored digital sample to be stored in storage stage $118_m$, as shown.

The floating point error signal $e_n$ is computed in accordance with:

$$e_n = sgn(e_n) \cdot T \cdot 2^{-I_n} \qquad (3)$$

where:

sgn is the sign function;

T is the integer part (i.e., the mantissa) of the error signal, $e_n$, rounded to one bit, (i.e., T=1), and $I_n$ is the exponent of the error signal, $e_n$.

Note that the approximation (i.e., rounding) is of the same order of magnitude as the error signal, $e_n$. Because the integer part (i.e., mantissa), T, was obtained by rounding, the approximation will be sometimes greater than the error, $e_n$, other times less than the error $e_n$. As a result, the speed of convergence will not be affected on average.

Taking into account that the adaptation coefficient, $\beta$ is also a power of two, $\beta=2^{-b}$, the update coefficient multiplier computation performed by multiplier 132 is as follows:

$$C_{n+1}=C_n-2^{-(b+1n)} \cdot sgn(e_n) \cdot r_{n-m} \tag{4}$$

As a result, the update coefficient multiplier 132 (i.e., equation (4)) is replaced by an addition/subtraction of a shifted version of the data, $r_{(n-m)}$.

It is noted that the coefficients stored in register 131 and the digital samples stored in register $118_m$ are stored in fixed point format. This format is necessary for the FIR computation (i.e., summer 113). The sign of the error, $\beta e_n$, selects the add/subtract operations via multiplier 177. The sum of the exponents of $\beta$ and $e_n$ controls the shifter 176. The shifting is done with zero padding in the least significant bit (LSB) positions and sign extensions in the most significant bit (MSB) positions.

For example, consider that b=0 and $e_n$=−0.55 base 10, i.e., −(0.55)$_{10}$. Converting $e_n$ to base 2 yields −(0.100011). Converting $e_n$ into floating point format yields −(1.00011)× $2^{-1}$. Rounding the mantissa of $e_n$ 1.00011 to the nearest bit (i.e., expressing the error $e_n$ to only a sign bit and an exponent term) yields $-2^{-1}$; i.e., the sign bit is negative and the exponent term is −1. (It is noted that expressing this approximation in base 10 yields −.5). Assume that the data stored in register $118_m$ is 5 base 10 (i.e., 101.0 base 2). The operation of the shifter 176 would, in this example, shift 101.0 in accordance with the exponent, here −1. Thus, here 101.0 would shift to the right one bit producing at the output of the shifter 176 the bits (010.1). The multiplier 177 would multiply the shifter 176 output by the negative sign bit of the error signal, $e_n$, to produce the output −(010.1) (i.e., −2.5 in base 10). It is noted that if the exponent were a positive number the shifter 176 would have shifted the bits of the data stored in register $118_m$ to the left a number of bits equal to the exponent.

It is noted that the gear shifting, which is used frequently during adaptation, can be implemented by changing the value of the parameter b. That is, by gear shifting the adaptation coefficient is initially a large value and then is gradually reduced.

Thus, multiplier 134 is a floating point multiplier, as shown in FIG. 4, and includes a shifter 175 and a multiplier 135. The coefficient, $c_m$, stored in register 131 is fed to a fixed to floating point converter 190. A signed mantissa, $sgn(c^m{}_n)T(c^m{}_n)$, here typically nine bits, is produced on bus 191 and an exponent term ($I_{cn}$) is produced on bus 193. Here, the exponent term ($I_{cn}$) is typically 3 bits. The fixed point digital sample, $r_{n-m}$, stored in storage stage $118_m$ is multiplied by the signed mantissa on bus 191 in multiplier 135. The output of multiplier 135 is fed to the shifter 175 along with the exponent term ($I_{cn}$) on bus 193. Thus, the shifter 175 shifts the fixed point digital sample, $r_{n-m}$, stored in storage state $118_m$ a number of bits in accordance with the exponent term ($I_{cn}$) on bus 193. The shift is to the right if the sign of the exponent $I_{cn}$ is negative and such shift is to the left if the sign of $I_{cn}$ positive. The output of the shifter 175 is fed to output tap $111_m$, as shown. The coefficient weighting performed by the floating point converter 190 may be represented as:

$$c^n{}_m = sgn(c^n{}_m)T(C^n{}_m)[2^{-Icn}] \tag{5}$$

Here, $T(c^m{}_n)$ is an integer, representing the mantissa of the coefficient stored in register 131. The coefficient mantissa, sign included, is multiplied in multiplier 135 to the data, i.e., the digital sample, $r_{n-m}$, stored in storage stage $118_m$. The multiplier 135 output is shifted by the shifter 175 an amount given by the coefficient exponent term ($I_{cn}$) on bus 193. The data produced at the output of the shifter 175 at tap $111_m$ results in fixed point arithmetic. This is useful because the individual multiplication products at the taps $111_{-M}$ through $111_{+M}$ must be subsequently added in adder 113.

This system 110 requires the conversion of the error from fixed point to floating point representation. This is a rather complex operation, but it is limited to only one quantity, the error, while the reduction in silicon area and power dissipations affect all taps.

The same concept can be applied to the coefficient multiplier 134 in order to simplify the multiplication operations in the computation of the error. Such a representation requires a smaller multiplier length.

The number of bits used for mantissa representation of typically 9 is less than the number of bits used for fixed point representation typically 13 bits. Consequently the width of the multiplier 135 in FIG. 4 is smaller than in the equalizer 10 shown in FIG. 2.

Further improvements can be obtained if the taps are split in two categories, as follows:

Category I: The taps around the center tap (m=0 in equation (1)), whose coefficients are larger. A larger number of bits are allocated for the coefficient mantissa, resulting in a larger floating point multiplier 134 width; and Category II: The taps far away from the center tap, the coefficients of which are small and play a less important role.

Usually three or four bits for the mantissa (typically 4 bits) are sufficient for Category II. There is an added complexity due to the fact that the coefficients are in fixed point representation.

Simulations show that in the case of the equalizer update using a floating point coefficient multiplier 132 instead of a fixed point multiplier leads to a reduction of silicon area, accompanied by a similar reduction in power dissipation as compared with the equalizer 10 described above in connection with FIG. 2. Using the floating point multiplier for the coefficients for the weighting section multiplier 134 (FIG. 3) leads to a reduction of the size of the multiplier 135; however the conversion from fixed point to floating point implementation, which must be done for each tap, cuts this advantage.

Figure 5:
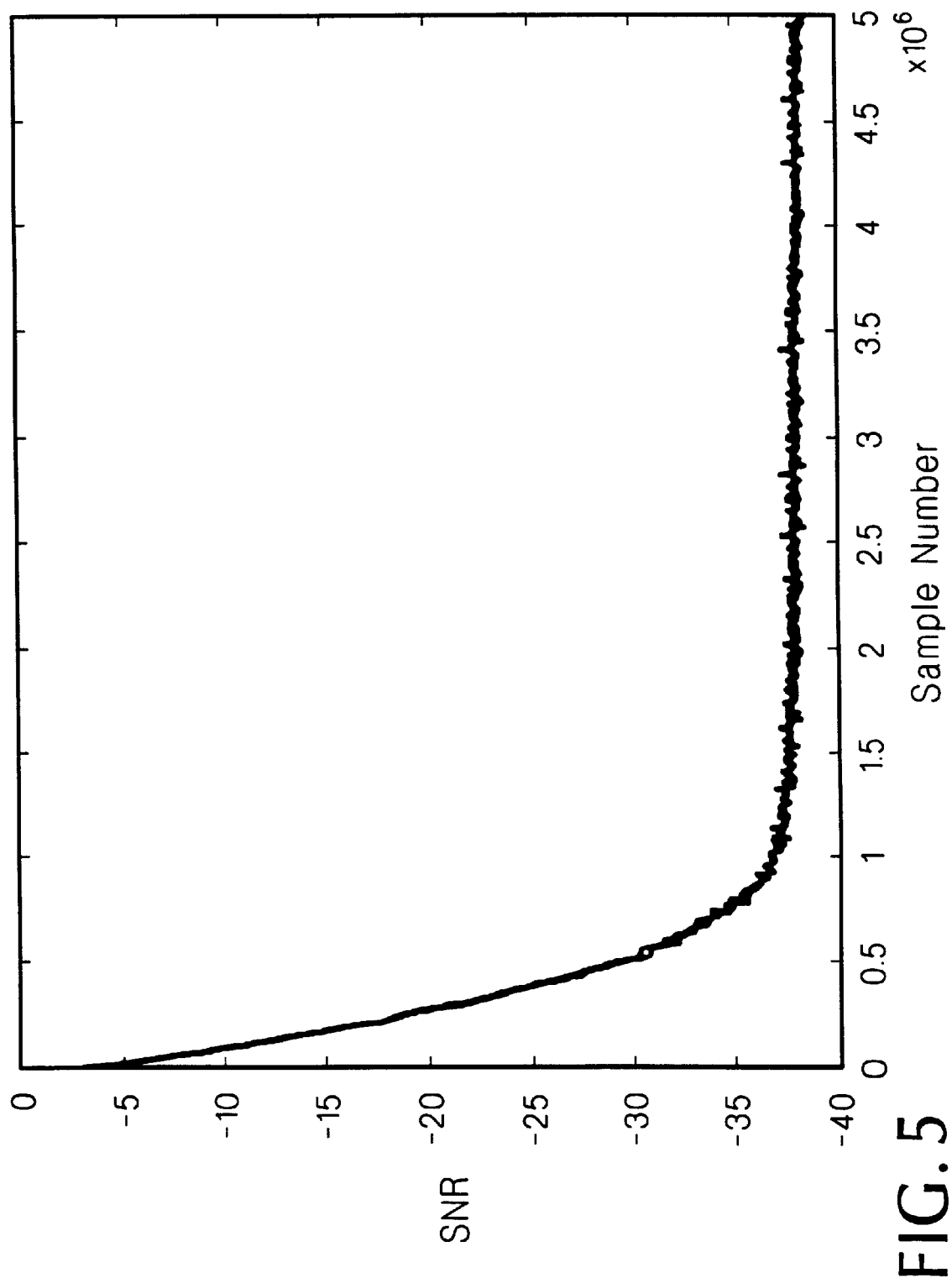
FIG. 5 is a curve showing a signal to noise ratio (SNR) at the input to a slicer used in the adaptive filter of FIG. 4 as a function a number of samples processed by the filter for both an equalizer according to the invention using a single bit approximation of the mantissa of an error signal, $e_n$, produced by the equalizer of FIG. 4 and using an exact representation of such error signal, $e_n$.

Referring to FIG. 5, curves are shown comparing signal to noise ratio (SNR) averaged over 1000 bands at the input to a slicer 114 using in the adaptive filter of FIG. 4 as a function a sample number using a single bit approximation of an error signal, $e_n$, (i.e., representing the floating point format error signal, $e_n$, as only a sign bit and exponent term), and using an exact representation of such error signal, $e_n$ (i.e., a sign bit, a multi-bit mantissa term and an exponent term). It is noted that the curves fall substantially on top of one another.

Figure 6:
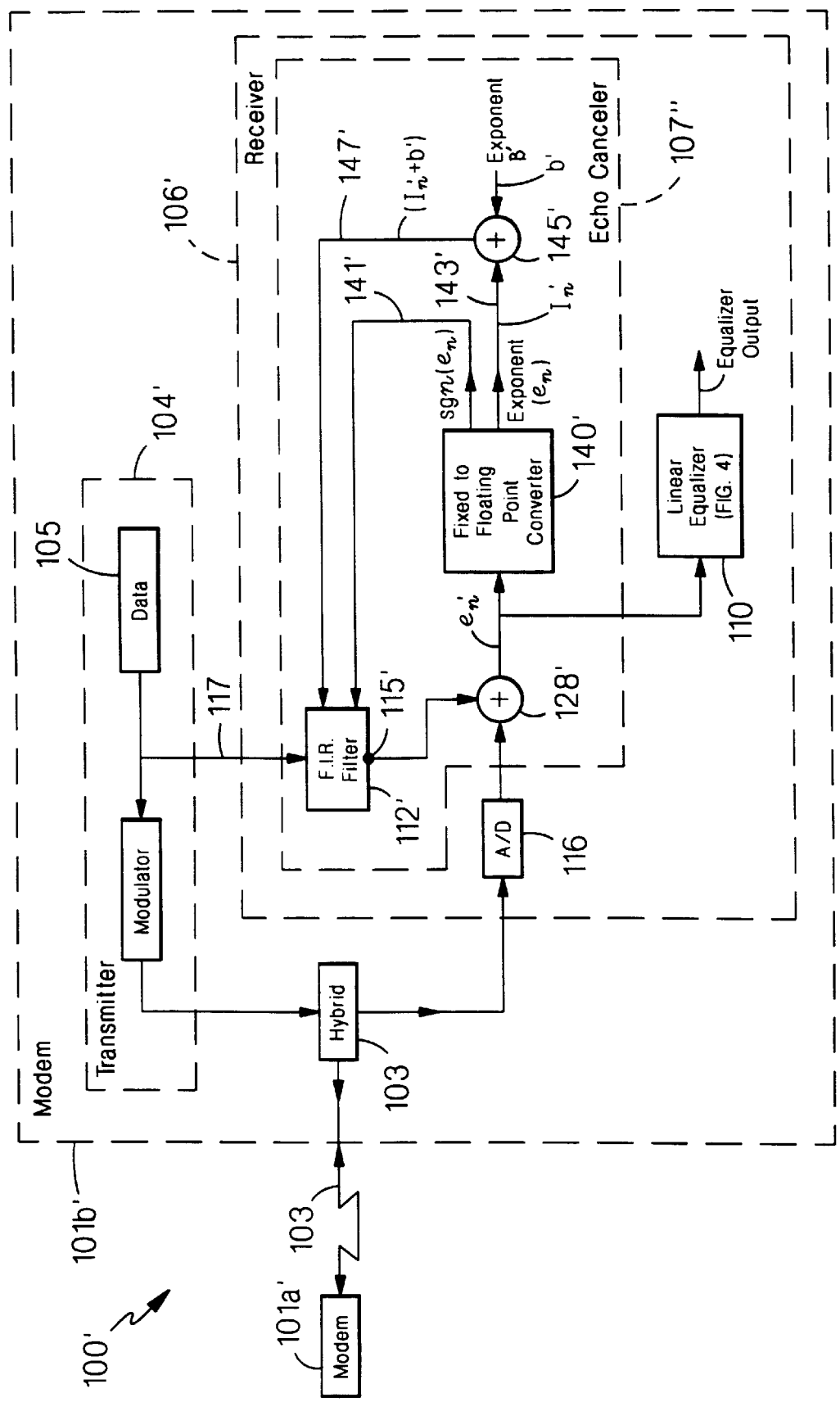
FIG. 6 is a block diagram of communication system wherein a modem thereof includes adaptive filters of FIG. 4, one of the filters being configured as an echo canceler according to the invention and another one of the filters being configured as the linear equalizer of FIG. 4 according to the invention.

Referring now to FIG. 6, a communication system 100' is shown to include a pair of modems 101'a, 101'b interconnected for communication over the communication channel 103. Each one of the modems 101'a, 101'b included a transmitter 104' and a receiver 106', as shown for modem 101'b. The transmitter 104' and receiver 106' are connected to the communication channel though a hybrid 103, as shown. The transmitter 104' includes a modulator fed by data 105 which is also fed to an echo canceler 107, as shown. The echo canceler 107 is an adaptive filter and includes a differencing network 128', a fixed to floating point converter 140' and an FIR filter 112', arranged as shown. The differencing network 128' is fed by samples produced by A/D converter 116 and the output 115' of the FIR filter 112', as shown. Thus, the samples produced by A/D converter 116 are subtracted from the data produced at the output 115' of filter 112' to produce an error signal e'$_n$, as shown. The error signal is in fixed point format. The exponent of the error signal (i.e., I'$_n$) is fed on bus 143' to an adder 145'. The exponent, b', of an adaptation coefficient β' is added to I'$_n$ in the adder 145' to produce (b'+I'$_n$) on bus 147' which is fed to the FIR filter 112'. The sign of the error signal, sgn(e$_n$) is fed on line 141' to the FIR filter 112'. The FIR filter 112', bus 147' and line 141' are equivalent to the FIR filter 112, bus 147 and line 141. Thus, (b+I'$_n$) is fed to a shifter 176 (FIG. 4) and sgn(e$_n$) is fed to a multiplier 177. The filtered output of the FIR filter 112, i.e., output 115' is fed to one of the pair of inputs to the differencing network 128' as discussed above. Here again, a single bit representation is used for the mantissa of the error signal e'$_n$.

The receiver 106' includes the linear equalizer 110, shown in FIG. 4. Here, however, the linear equalizer 110 is fed by the fixed point format data produced by the differencing network 128' to reduce intersymbol interference and noise. That is, the echo canceler reduces the effect of the local transmitter portion of the received composite signal from such composite received signal to produce at the output of the differencing network a signal representative of the signal transmitted by the remote modem transmitter albeit corrupted with any intersymbol interference and noise. The output of the differencing network is fed to a linear equalizer to reduce such intersymbol interference and noise.

Other embodiments are within the spirit and scope of the appended claims.

What is claimed is:

1. An adaptive filtering method comprising the step of modifying coefficients of a finite impulse response filter fed by a sequence of digital samples in accordance with an error signal provided to the filter only by the sign bit and exponent term of the floating point representation of such error signal.

2. The method recited in claim 1 including the step of combining an exponent term of the floating point format error signal with an exponent of an adaptation coefficient to produce a composite signal and the step of modifying coefficients of the finite impulse response filter comprises the step of modifying such coefficients in accordance with the composite signal.

3. The method recited in claim 2 wherein each one of a plurality of taps of the finite impulse response filter includes a shifter and such method includes the step of feeding such shifter with data stored in such tap and the composite signal and wherein the data has bits thereof shifted in position in accordance with the composite signal.

4. The method recited in claim 3 wherein the adaptation of the coefficients from the plurality of taps of the finite impulse response filter comprises the step of shifting data stored in such tap in accordance with the exponent of the composite signal; and including the step of adding or subtracting the shifted data from a present value of the finite impulse filter coefficient to generate a future value of the coefficient in accordance with the sign of the composite signal.

5. The method recited in claim 1 including the steps of:
filtering the sequence of digital samples to produce a sequence of outputs in fixed point format from the finite impulse response filter;
producing the error signal in fixed point format in accordance with a difference between the outputs produced by the finite impulse response filter and a sequence of digital samples; and
converting the fixed point format error signal to the floating point format error signal provided to finite impulse response filter.

6. The method recited in claim 5 including the step of combining an exponent term of the floating point format error signal with an exponent of an adaptation coefficient to produce a composite signal and the step of modifying coefficients of the finite impulse response filter comprises the step of modifying such coefficients in accordance with the composite signal.

7. A digital communication system wherein a pair of modems communicate through a channel, one of the modems including a receiver having an adaptive filter, such adaptive filter, comprising:
(A) a finite impulse response filter fed by a sequence of digital samples and a composite error signal for producing a sequence of outputs in fixed point format;
(B) an error signal generator for producing an error signal in fixed point format in accordance with a difference between the outputs produced by the finite impulse response filter and a sequence of digital samples;
(C) a fixed to floating point converter for converting the fixed point format error signal into a floating point format error signal having a sign bit and an exponent of the floating point representation of such error signal;
(D) an adder for adding the error signal exponent to an exponent of an adaptation coefficient to produce the composite signal.

8. The system recited in claim 7 wherein the finite impulse response filter comprises a plurality of taps, each tap comprising:
A. a coefficient register for storing the weighting coefficient value;
B. a shifter controlled by the exponent of the composite signal to shift the weighting coefficient value stored in the coefficient register; and
C. an adder/subtractor controlled by the sign of the composite signal for adding or subtracting an output of the shifter to the weighting coefficient value stored in the coefficient register, an output of the adder/subtractor being used to update the content of the coefficient register.

9. A method for equalizing amplitude and phase dispersion in a communication channel, such method comprising the step of modifying coefficients of a finite impulse response filter fed by a sequence of digital samples of information received from the channel in accordance with an error signal provided to the filter only by the sign bit and exponent term of the floating point representation of such error signal.

10. The method recited in claim 9 including the step of combining the exponent of the error signal with an exponent of an adaptation coefficient to produce a composite signal and the step of modifying the coefficients of the finite impulse response filter comprises the step of modifying such coefficients in accordance with the composite signal.

11. The method recited in claim 10 including the steps of:
filtering the sequence of digital samples to produce a sequence of outputs in fixed point format from the finite impulse response filter;
converting the outputs into estimated output symbols in fixed point format;
producing the error signal in fixed point format in accordance with a difference between the outputs produced by the finite impulse response filter and the estimated output symbols; and converting the fixed point format error signal to the floating point format error signal provided to finite impulse response filter.

12. The method recited in claim 10 wherein the adaptation of the coefficients from the plurality of taps of the finite impulse response filter comprises the step of shifting the stored digital samples of the received signal in a shifter in accordance with the exponent of the composite signal; and including the step of adding or subtracting an output of the shifter from a present value of the finite impulse filter coefficient to generate a future value of the coefficient in accordance with the sign of the composite signal.

13. The method recited in claim 10 including the steps of:

filtering the sequence of digital samples of the signal generating the echo signals to produce a sequence of outputs in fixed point format from the finite impulse response filter;

producing the error signal in accordance with a difference between an output produced by the finite impulse response filter and a digital sample corrupted by the echo signals; and converting the fixed point format error signal to the sign and exponent part of the floating point representation of the fixed point format error signal.

14. A method for canceling echo signals produced in a communication channel, such method comprising the step of modifying coefficients of a finite impulse response filter fed by a sequence of digital samples of a signal transmitted through the channel to a remote receiver in accordance with an error signal provided to the filter only by the sign bit and exponent term of the floating point representation of the error signal.

15. The method recited in claim 14 including the step of combining the exponent of the error signal with an exponent of an adaptation coefficient to produce a composite signal and the step of modifying the coefficients of the finite impulse response filter comprises the step of modifying such coefficients in accordance with the composite signal.

16. The method recited in claim 15 wherein the adaptation of the coefficients from the plurality of taps of the finite impulse response filter comprises the step of shifting the stored samples in accordance with the exponent of the composite signal; and including the step of adding or subtracting the output of the shifter from a present value of the finite impulse filter coefficient to generate a future value of the coefficient in accordance with the sign of the composite signal.

17. An adaptive filter, comprising:

(A) a finite impulse response filter fed by a sequence of digital samples and a composite error signal having only the sign bit and exponent term of the floating point representation of such composite error signal for producing a sequence of outputs in fixed point format;

(B) an error signal generator for producing an error signal in fixed point format in accordance with a difference between the outputs produced by the finite impulse response filter and a sequence of digital samples.

18. A digital communication system wherein a pair of modems communicate through a channel, one of the modems including a receiver having a linear equalizer, such a linear equalizer comprising:

A. a finite impulse response filter fed by a sequence of digital samples of information received by a receiver in the channel;

B. a slicer fed by the finite impulse response filter for converting outputs of the finite impulse response filter into estimated output symbols in fixed point format;

C. an error signal generator for producing an error signal in fixed point format in accordance with a difference between the output produced by the finite impulse response filter and the estimated output symbol produced by the slicer;

D. a converter for converting the fixed point format error signal into the sign and exponent part of the floating point representation of such fixed point format error signal; and E. an adder for adding the error signal exponent to the exponent of an adaptation coefficient to produce the composite signal.

19. The system recited in claim 18 wherein the finite impulse response filter comprises a plurality of taps, each tap comprising:

A. a coefficient register for storing the weighting coefficient value;

B. a shifter controlled by the exponent of the composite signal to shift the weighting coefficient value stored in the coefficient register; and C. an adder/subtractor controlled by the sign of the composite signal which adds/subtracts the output of the shifter to the content of the coefficient register, its output being used to update the content of the coefficient register.

20. A digital communication system wherein a pair of modems communicate through a channel one of the modems including a receiver having an echo canceler, such echo-canceler comprising:

A. a finite impulse response filter fed by a sequence of digital samples of a signal produced by the transmitter of such modem;

B. an error signal generator for producing an error in fixed point format in accordance with a difference between an output produced by the finite impulse response filter and a digital sample of information received by receiver through the channel;

C. a converter for converting the fixed point format error signal into the sign and exponent part of the floating point representation of the fixed point format error signal; and D. an adder for adding the error signal exponent to the exponent of an adaptation coefficient to produce the composite signal.

21. The system recited in claim 20 wherein the finite impulse response filter comprises a plurality of taps, each tap comprising:

A. a coefficient register for storing the weighting coefficient value;

B. a shifter controlled by the exponent of the composite signal to shift the stored weighting coefficient value; and C. an adder/subtractor controlled by the sign of the composite signal for adding or subtracting an output of the shifter to the weighting coefficient value stored in the coefficient register, an output of the adder/subtractor being used to update the weighting coefficient value stored in the coefficient register.

* * * * *